United States Patent
Chen et al.

(10) Patent No.: US 10,031,573 B2
(45) Date of Patent: Jul. 24, 2018

(54) ENERGY EFFICIENCY STRATEGY FOR INTERRUPT HANDLING IN A MULTI-CLUSTER SYSTEM

(71) Applicant: MediaTek Inc., Hsinchu (TW)

(72) Inventors: Jia-Ming Chen, Zhubei (TW);
Hung-Lin Chou, Zhubei (TW);
Pi-Cheng Hsiao, Taichung (TW);
Ya-Ting Chang, Hsinchu (TW);
Yun-Ching Li, Taoyuan County (TW);
Yu-Ming Lin, Taipei (TW)

(73) Assignee: MediaTek, Inc., Hsinchu (TW)

( * ) Notice: Subject to any disclaimer, the term of this patent is extended or adjusted under 35 U.S.C. 154(b) by 0 days.

(21) Appl. No.: 14/931,923

(22) Filed: Nov. 4, 2015

(65) Prior Publication Data
US 2016/0139655 A1 May 19, 2016

Related U.S. Application Data

(60) Provisional application No. 62/080,617, filed on Nov. 17, 2014, provisional application No. 62/111,138,
(Continued)

(51) Int. Cl.
*G06F 9/46* (2006.01)
*G06F 1/32* (2006.01)
*G06F 9/50* (2006.01)

(52) U.S. Cl.
CPC ............ *G06F 1/3287* (2013.01); *G06F 1/324* (2013.01); *G06F 1/3206* (2013.01);
(Continued)

(58) Field of Classification Search
None
See application file for complete search history.

(56) References Cited

U.S. PATENT DOCUMENTS

| | | |
|---|---|---|
| 2009/0070511 A1 | 3/2009 | Kaushik et al. |
| 2009/0222654 A1 | 9/2009 | Hum et al. |

(Continued)

FOREIGN PATENT DOCUMENTS

| | | |
|---|---|---|
| CN | 102812445 A | 12/2012 |
| EP | 15193510.3 | 1/2016 |

OTHER PUBLICATIONS

Niccolini et al., "Building a power-proportional software router", Intel Labs Berkeley, downloaded by EPO on Apr. 11, 2013.
(Continued)

*Primary Examiner* — Sisley Kim
(74) *Attorney, Agent, or Firm* — Tong J. Lee

(57) ABSTRACT

Energy efficiency is managed in a multi-cluster system. The system detects an event in which a current operating frequency of an active cluster enters or crosses any of one or more predetermined frequency spots of the active cluster, wherein the active cluster includes one or more first processor cores. When the event is detected, the system performs the following steps: (1) identifying a target cluster including one or more second processor cores, wherein the each first processor core in the first cluster and each second processor core in the second cluster have different energy efficiency characteristics; (2) activating at least one second processor core in the second cluster; (3) determining whether to migrate one or more interrupt requests from the first cluster to the second cluster; and (4) determining whether to deactivate at least one first processor core of the active cluster based on a performance and power requirement.

46 Claims, 10 Drawing Sheets

Related U.S. Application Data filed on Feb. 3, 2015, provisional application No. 62/148,320, filed on Apr. 16, 2015.

(52) U.S. Cl.
CPC .......... *G06F 9/5088* (2013.01); *Y02D 10/126* (2018.01); *Y02D 10/171* (2018.01); *Y02D 50/20* (2018.01)

(56) References Cited

U.S. PATENT DOCUMENTS

| | | | |
|---|---|---|---|
| 2009/0271646 A1* | 10/2009 | Talwar | G06F 1/3203 713/322 |
| 2013/0205126 A1 | 8/2013 | Kruglick | |
| 2013/0339771 A1* | 12/2013 | Ryu | G06F 9/5094 713/323 |
| 2014/0059548 A1* | 2/2014 | Ahmad | G06F 9/5088 718/100 |
| 2014/0095801 A1 | 4/2014 | Bodas et al. | |
| 2014/0095904 A1 | 4/2014 | Ananthakrishnan et al. | |
| 2014/0129808 A1 | 5/2014 | Naveh et al. | |
| 2014/0173623 A1* | 6/2014 | Chang | G06F 9/5088 718/105 |
| 2016/0196157 A1* | 7/2016 | Kodama | G06F 9/45558 718/1 |

OTHER PUBLICATIONS

PCT/CN2015/094672 filed Nov. 16, 2015; Notice of International Search Report and Written Opinion dated Feb. 15, 2016.

\* cited by examiner

ENERGY EFFICIENCY STRATEGY FOR INTERRUPT HANDLING IN A MULTI-CLUSTER SYSTEM

CROSS-REFERENCE TO RELATED APPLICATIONS

This application claims the benefit of U.S. Provisional Application No. 62/080,617 filed on Nov. 17, 2014, U.S. Provisional Application No. 62/111,138 filed on Feb. 3, 2015, and U.S. Provisional Application No. 62/148,320 filed on Apr. 16, 2015.

TECHNICAL FIELD

Embodiments of the invention relate to a multi-cluster computing system; and more specifically, to performance and power management in a multi-cluster computing system that has more than one processor type.

BACKGROUND

Dynamic frequency scaling is a technique that automatically adjusts the frequency of a processor at runtime. An increase in the operating frequency of a processor can ramp up the computing performance. However, a frequency increase means that power consumption of the processor also increases, as the power consumption in an integrated circuit is computed as: $P=C \times V^2 \times F$, where P is the power, C is the capacitance being switched per clock cycle, V is the voltage and F is the frequency. Some modern computer systems have a built-in management framework to manage the tradeoff between performance and power consumption. For example, the management framework may include a power controller that determines at runtime whether to increase or decrease operating frequency in order to satisfy system performance requirements or to save power.

In a multi-cluster computer system that has more than one processor type, the management framework needs to take into consideration both power consumption and performance of each processor type. In a system that allows multiple processor types to operate at the same time, the management framework may set a different operating frequency for each processor type, or may set the same operating frequency for all processor types. Running a system with multiple operating frequencies at the same time generally requires multiple voltage regulators, resulting in higher hardware cost. Running a system with the same operating frequency for all processor types at the same time may compromise the performance of the different processor types. In a system that has multiple processor types but allows only one processor type to operate at a time, the processing capacity of the other processor types is under-utilized even though there may be a high workload demand.

Therefore, there is a need to improve the power and performance management in a multi-cluster system that has more than one processor type.

SUMMARY

In one embodiment, a method for managing energy efficiency in a computing system is provided. The method begins with detecting an event in which a current operating frequency of an active cluster enters or crosses any of one or more predetermined frequency spots of the active cluster, wherein the active cluster includes one or more first processor cores. When the event is detected, the method comprises performing the following steps of: identifying a target cluster including one or more second processor cores, wherein each first processor core in the active cluster and each second processor core in the target cluster have different energy efficiency characteristics; activating at least one second processor core in the target cluster; determining whether to migrate one or more interrupt requests from the active cluster to the target cluster; and determining whether to deactivate at least one first processor core of the active cluster based on a performance and power requirement.

In another embodiment, a system is provided. The system includes a plurality of clusters which further include a plurality of processor cores, and an interconnect coupled to the plurality of clusters. One or more of the processor cores are operative to perform operations of a management module. The management module is configured to detect an event in which a current operating frequency of an active cluster enters or crosses any of one or more predetermined frequency spots of the active cluster, wherein the active cluster includes one or more first processor cores. The management module is further configured to, when the event is detected, identify a target cluster including one or more second processor cores, wherein each first processor core in the active cluster and each second processor core in the target cluster have different energy efficiency characteristics; activate at least one second processor core in the target cluster; determine whether to migrate one or more interrupt requests from the active cluster to the target cluster; and determine whether to deactivate at least one first processor core of the active cluster based on a performance and power requirement.

According to embodiments described herein, a multi-cluster system having processor cores of different energy efficiency characteristics can operate with high efficiency such that the performance and power requirements can be satisfied.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

Figure 1:
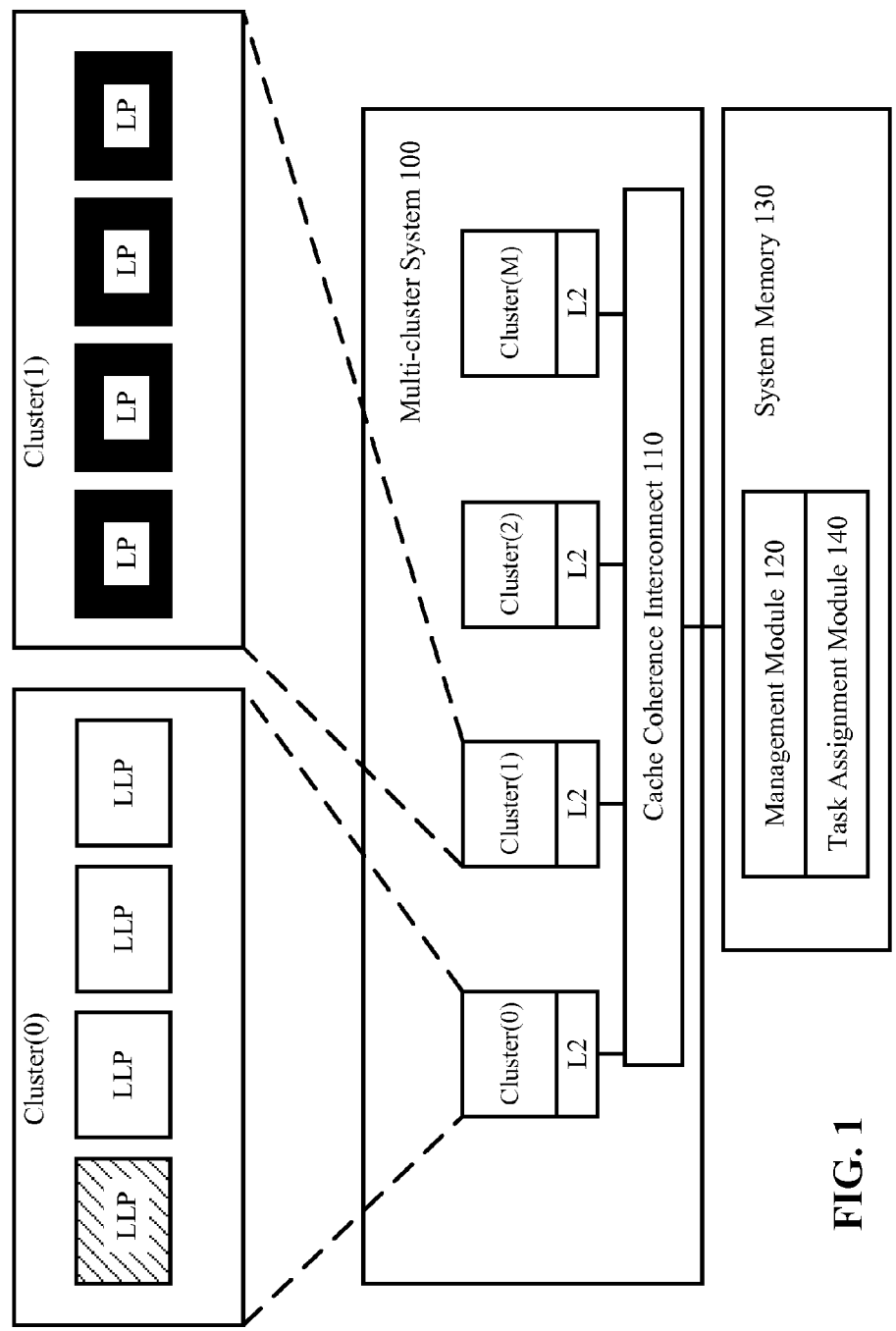
FIG. 1 illustrates an example of a multi-cluster system according to one embodiment.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

It should be noted that the term "multi-cluster system" as used herein is a "multi-core processor system" arranged and managed as multiple clusters. A multi-core processor system may be a multi-core system or a multi-processor system, depending upon the actual design. In other words, the proposed method may be employed by any of the multi-core system and the multi-processor system that is arranged and managed as multiple clusters. For example, concerning the multi-core system, all of the processor cores may be disposed in one processor. For another example, concerning the multi-processor system, each of the processor cores may be disposed in one processor. Hence, each of the clusters may be implemented as a group of one or more processors.

Embodiments of the invention provide a system and method for managing power and performance in a multi-cluster system that include two or more clusters. Each cluster may include processor cores of the same processor type, and processor cores of different processor types may belong to different clusters. Different processor types have different energy efficiency characteristics as the operating frequency changes. In one embodiment, the multi-cluster system can designate any processor core in any one of the clusters as an interrupt-handling processor. An interrupt-handling processor handles interrupt requests that are originated from peripheral devices or other processor cores in the system. Unlike a conventional system where a fixed processor core is designated to handle interrupt requests, the multi-cluster system described herein can switch the interrupt-handling role from one processor core to another within a cluster or across any clusters.

Furthermore, as used herein, "deactivating a processor core" means that the processor core is either powered off completely (i.e., receiving no power) or enters a low-power state. A processor core may be powered off by hot-plug (i.e., powered off or physically removed during operating system runtime) or other mechanisms. "Deactivating a cluster" means that all processor cores in that cluster either are powered off completely or enter a low-power state. "Activating a processor core" means that the processor core is powered on and enters either a standby state or an active state of executing instructions. "Activating a cluster" means that one or more processor cores in that cluster enter a standby or active state. An "activated" processor core or cluster is also referred to as an "active" processor or cluster. Similarly, a "deactivated" processor core or cluster is also referred to as an "inactive" processor core or cluster.

Moreover, the term "type" in connection with a "processor type" refers to common characteristics shared by a group of processor cores, where the common characteristics include, but are not limited to, energy efficiency characteristics and computation performance. The "energy efficiency," or equivalently, "power efficiency" of a processor core is measured with respect to a frequency or a frequency range. A number of metrics may be used for the measurements, one of which is MIPS/MW, which stands for million-instruction-per-second/megawatt, or MHz/MW, which stands for megahertz/megawatt. Energy efficiency is opposite to power consumption; processor cores that have high energy efficiency in a frequency range consume low power in that frequency range.

According to embodiments of the invention, a multi-cluster system includes a first cluster which is currently active and which further includes one or more first processor cores. When the multi-cluster system detects an event in which a current operating frequency of the first cluster (i.e., the active cluster) enters or crosses any of one or more predetermined frequency spots of the first cluster, the system performs the following steps: (1) identifying a second cluster (i.e., the target cluster) that includes one or more second processor cores, each first processor cores in the first cluster and each second processor cores in the second cluster having different energy efficiency characteristics; (2) activating at least one second processor cores in the second cluster; (3) determining whether to migrate one or more interrupt requests from the first cluster to the second cluster; and (4) determining whether to deactivate at least one first processor core in the active cluster based on a performance and power requirement. In one embodiment, the second cluster is identified to be one of the clusters that is associated with the entered or crossed predetermined frequency spot. Furthermore, if the second cluster is already activated before step (2), the active state of the target cluster is maintained. If the second cluster is not activated before step (2), the target cluster is switched to the active state (i.e., activated).

In one embodiment, the aforementioned event may be an indication that the first cluster is not operating with energy efficiency. In the multi-cluster system, the clusters can be associated with respective one or more predetermined frequency spots. The event is detected when the current operating frequency of the first cluster enters or crosses (i.e., passes through) a frequency spot, which is any of the one or more frequency spots of the first cluster. The respective one or more predetermined frequency spots can be determined based on respective energy efficiency characteristics of processor cores of the clusters. Each of these frequency spots can be a boundary area of the predetermined frequency range in which the first cluster operates with energy efficiency. The frequency range and frequency spots may be predetermined by the designer or manufacturer of the processor cores. Furthermore, in some embodiments, the system includes a voltage regulator to control the voltage supplied to the different processor cores of different processor types in the system. Having a single voltage regular for the entire system can save hardware cost, compared to systems where each cluster, or each processor core, has its own voltage regulator. However, the disclosure is not limited to a single voltage regulator or multiple voltage regulators.

When the event is detected, the interrupt requests may migrate to another processor core in a second cluster. In some cases, when the event is detected, after the interrupt requests are migrated to another processor core in a second cluster, the first cluster may be deactivated. If the interrupt requests are migrated to the second cluster, depending on the system workload the system may or may not keep the first cluster activated. Thus, the system is not required to keep a fixed processor core or a fixed cluster operating all the time to handle interrupt requests. As a result, the system can operate more efficiently. The decisions as to whether to migrate the interrupt requests and whether to deactivate the first cluster may be dependent on a number of factors to be described in detail below.

In one embodiment, at least one of the aforementioned determinations of step (3) whether to migrate one or more interrupt requests from the first cluster to the second cluster; and step (4) whether to deactivate one or more currently active clusters of the clusters based on a performance and power requirement, is dependent on a comparison between a required number of active processor cores and the total number of active processor cores in the multi-cluster system. In other words, at least one of the determinations of step (3) and step (4) is performed according to the required number of active processor cores and the total number of active processor cores in the multi-cluster system.

In one embodiment, one factor for determining the required number of active processor cores or whether the active cluster is to be deactivated is the number of threads or tasks that need to be processed. An indicator, called hTLP, represents the number of threads or tasks with loading, where h represents loading and TLP represents "Thread Level Parallelism" or "Task Level Parallelism." The "loading" may be a percentage or ratio (e.g., 50%, 80%, 100%, etc.). The hTLP indicates the required number of active processor cores for processing a system workload. In one embodiment, the required number of active processor cores can be obtained or calculated from the number of threads or tasks with loading greater than a threshold, e.g., the number of threads or tasks that the system is required to process multiplied by the loading. The loading increases when system workload increases and the number of active cores stays the same. When the loading exceeds a predetermined threshold, more processor cores or more clusters may be activated to keep the loading below that threshold. In one embodiment, the determination of how many active processor cores and active clusters to have in the system depends on the value of hTLP.

FIG. 1 illustrates an example of a multi-cluster system 100 according to one embodiment. In this example, the multi-cluster system 100 includes Cluster(0), Cluster(1), . . . , Cluster(M). In alternative embodiments, the multi-cluster system 100 may include any number of clusters that is at least two. In one embodiment, the clusters receive substantially the same voltage from a voltage regulator. "Substantially the same" hereinafter means "the same" or "within a predetermined tolerance range." Each cluster includes one or more processor cores that share the same L2 cache. Each cluster also has access to a system memory 130 via a cache coherence interconnect 110. In one embodiment, the multi-cluster system 100 uses a management module 120 that detects an event for migrating interrupt requests from one processor core to another, and for activating and/or de-activating processor cores or clusters to satisfy system design requirements such as to achieve energy efficiency.

The multi-cluster system 100 also uses a task assignment module 140 that assigns and schedules tasks among the processor cores to achieve workload balance within each cluster. The management module 120 and the task assignment module 140 may be implemented by hardware, software, or a combination of both. In an embodiment where the management module 120 and the task assignment module 140 are implemented by software, the software may be stored in the system memory 130 or other non-transitory computer readable medium accessible by the multi-cluster system 100. The software may be executed by a centralized hardware unit or by the activated clusters or processor cores in the multi-cluster system 100.

A close-up view of Cluster(0) and Cluster(1) is shown in the upper part of FIG. 1 as an example. In this example, Cluster(0) includes four processor cores (e.g., four LLPs) and Cluster(1) also includes four processor cores (e.g., four LPs). It is understood that each cluster may include any number of processor cores, and different clusters may have different numbers of processor cores. In one embodiment, the LP and the LLP have the same or similar computation performance; that is, their differences in MIPS are negligible. However, energy efficiency characteristics of the LP and the LLP, when measured at the same temperature, are different from each other. The similarity in computation performance and differences in energy efficiency characteristics are not limited to Cluster(0) and Cluster(1). In the embodiment as shown in FIG. 1, all of the clusters in the system 100 have substantially the same computation performance, and different clusters have different energy efficiency characteristics.

The close-up view of Cluster(0) and Cluster(1) also shows, in this example, all four LLPs in Cluster(0) are activated (shown as white blocks) and all four LPs in Cluster(1) are de-activated (shown as black blocks). In addition, one of the LLPs is an interrupt-handling processor (shown as a white block with slanted lines). Although not shown in the close-up view, all of the other clusters Cluster(2), Cluster(3), . . . , Cluster(M) in this example are de-activated for simplicity of the description. However, it is understood that any of clusters may be active at any given time. As will be described later, when the operating frequency changes, another cluster (referred to as a "second cluster" or "target cluster") in the system 100 may be activated, and one or more of the processor cores in the second cluster may take over the interrupt handling role. Cluster(0) may stay activated or may be de-activated depending on whether the system 100 has sufficient active processor cores to handle the current or oncoming workload.

Figure 2B:
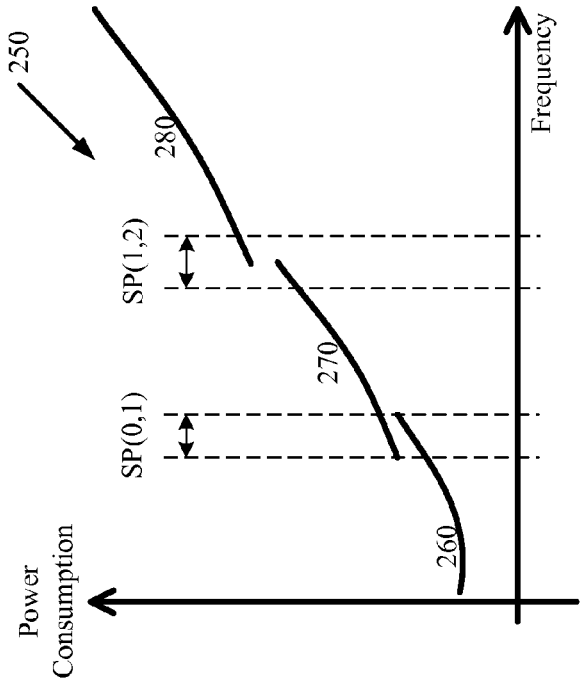
FIG. 2B illustrates another diagram of power consumption vs. frequency according to one embodiment.
Figure 2A:
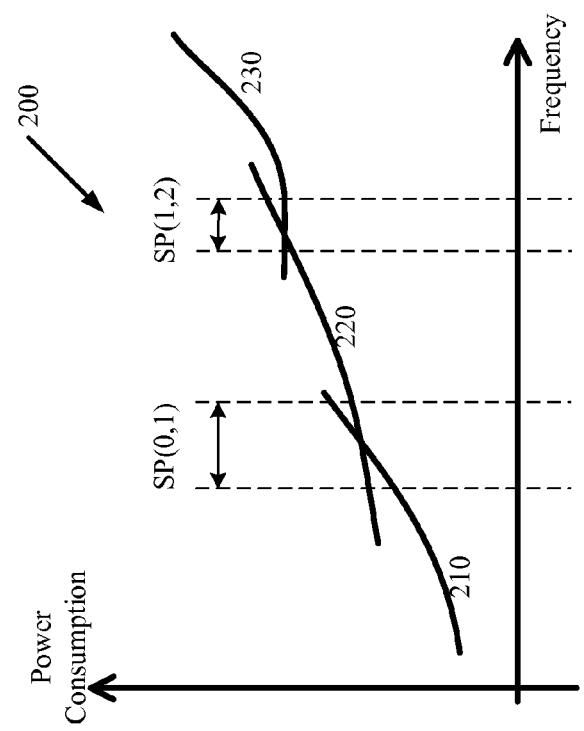
FIG. 2A illustrates a diagram of power consumption vs. frequency according to one embodiment.

FIG. 2A is a diagram 200 illustrating power consumption (which is the inverse of energy efficiency) vs. frequency according to one embodiment. Diagram 200 includes three curves 210, 220 and 230, representing the peak performance frequency ranges of Cluster(0), Cluster(1) and Cluster(2), respectively. The peak performance frequency ranges are indicators of energy efficiency characteristics of these clusters. Diagram 200 shows that Cluster(0) is most energy efficient in the low frequency range, Cluster(1) is most energy efficient in the mid-frequency range, and Cluster(2) is most energy efficient in the high frequency range. Diagram 200 also shows that curve 210 intersects curve 220, and curve 220 intersects curve 230. The regions of intersection SP(0,1) and SP(1,2) are called the sweet-spot frequency ranges, or simply as the sweet spots or frequency spots. A sweet spot SP(i,j) represents an upper boundary area for the peak performance frequency range of Cluster(i), and a lower boundary area for the peak performance frequency range of Cluster(j). These boundary areas are not hard limits on the operating frequency; e.g., Cluster(0) may also operate in the frequencies above SP(0,1), and Cluster(1) may also operate in the frequencies below SP(0,1). The boundary area merely indicates whether a cluster operates within a frequency range that is energy efficient for that cluster. Each sweet spot is associated with two clusters; e.g., SP(0,1) is associated with Cluster(0) and Cluster(1), and SP(1,2) is associated with Cluster(1) and Cluster(2). On one side of a given sweet spot, the energy efficiency of each processor core in one cluster is higher than each processor core in the other cluster; on the other side of the same given sweet spot, the energy efficiency of each processor core in the other cluster is higher than each processor core in the one cluster. For example, on the right side of SP(0,1), the energy efficiency of each processor core in Cluster(1) is higher than each processor core in the Cluster(0); on the left side of SP(0,1), the energy efficiency of each processor core in Cluster(0) is higher than each processor core in Cluster(1). In some embodiments, a cluster may be associated with more than two sweet spots, some of which may be located at one end of its peak performance frequency range and the others may be located at the other end of its peak performance frequency range.

FIG. 2B is another diagram 250 illustrating power consumption vs. frequency according to one embodiment. Similar to diagram 200, diagram 250 includes three curves 260, 270 and 280, representing the peak performance frequency ranges of Cluster(0), Cluster(1) and Cluster(2), respectively. However, diagram 250 differs from diagram 200 in that curves 260, 270 and 280 do not cross each other. In diagram 250, each of SP(0,1) and SP(1,2) is a frequency range between the tail-end of one curve and the head-end of the next adjacent curve. Although the curves 260, 270 and 280 do not cross each other, the energy efficiency characteristics they represent are the same as described before in connection with diagram 200.

Although only three clusters are shown in FIGS. 2A and 2B, it is understood that the aforementioned characteristics are extendable to any number of clusters. Moreover, different clusters may exhibit different characteristics represented by different curves. Some of the adjacent curves may cross each other, some of the adjacent curves may have overlapping regions, and some of the adjacent curves may have no overlapping region at all. It is understood that the operation of activating a second cluster with respect to the operating frequency change is applicable to any number of clusters represented by any of the different curves. These curves, as well as the sweet spots, may be determined from test results and experiments.

When migrating interrupt requests from one cluster to another in a system having more than two clusters, the migration may be direct or indirect. For example, if the current operating frequency increases from a point on curve 210 to a point on curve 230 (FIG. 2A), the initially active cluster (i.e., the first cluster) is Cluster(0) and the target cluster (i.e., the second cluster) is Cluster(2). The peak performance frequency range of Cluster(1), compared to the peak performance frequency range of Cluster(2), is closer to the peak performance frequency range of Cluster(0). The interrupt requests may migrate from Cluster (0) directly to one Cluster(2). Alternatively, interrupt requests may, at first, migrate from Cluster(0) to Cluster(1), and subsequent interrupt requests may migrate from Cluster(1) to Cluster(2).

Figure 3:
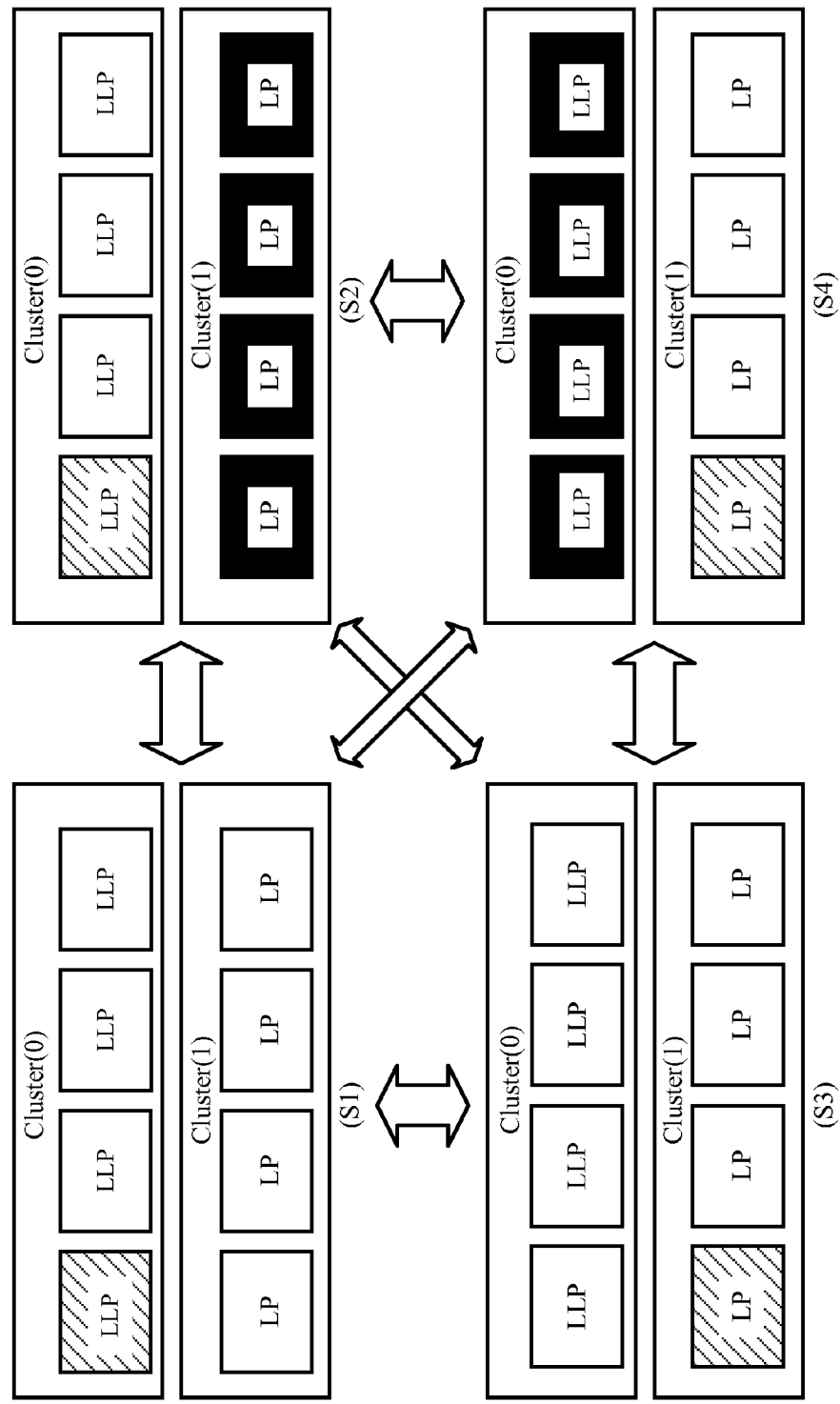
FIG. 3 illustrates transitions among four operating scenarios for two clusters according to one embodiment.

FIG. 3 illustrates the transitions of four operating scenarios for two clusters (e.g., Cluster(0) and Cluster(1)) according to one embodiment. Cluster(0) and Cluster(1) have the substantially the same computation performance and different energy efficiency characteristics; e.g., their energy efficiency curves may be the ones shown FIG. 2A or FIG. 2B. FIG. 3 illustrates four operating scenarios: (S1) and (S3) are high-performance scenarios in which both clusters are active, S(2) is a low-performance scenario in which only Cluster(0) is active, and (S4) is a mid-performance scenario in which only Cluster(1) is active. Each scenario may transition into any of the other scenarios. Both (S2) and (S4) operate under the condition that hTLP≤N, and both (S1) and (S3) operate under the condition that hTLP>N, where in this example N=4 (the total number of processor cores in a cluster).

In the following description, the "first cluster" refers to a cluster that is initially active. Thus, the first cluster is also referred to as an "active cluster." The "second cluster" refers to a cluster different from the first cluster. The second cluster is also referred to a "target cluster." In scenarios (e.g., (S1) and (S3)) where both clusters are initially active, the cluster that initially handles all interrupt requests are referred to as the first cluster. The transition between any two of the scenarios is triggered when the current operating frequency enters or crosses a frequency spot of the first cluster.

In (S2), only Cluster(0) is active and owns the interrupt-handling processor core (shown as the lined block) that handles all interrupt requests. When the current operating frequency enters SP(0,1) or crosses SP(0,1) from the frequency range of Cluster(0) into the frequency range of Cluster(1), the management module 120 activates Cluster (1), and determines whether to migrate interrupt requests to Cluster(1), and whether to deactivate Cluster(0). These determinations are dictated by which operating scenario that the system is currently in and which operating scenario that the system is to enter. The system may transition from (S2) to (S4), in which all interrupt requests are migrated to a processor core (shown as the lined block in scenario (S4)) in Cluster(1), and Cluster(0) is deactivated. Similarly, if the system is initially in (S4), the system may transition from (S4) to (S2) when the current operating frequency enters SP(0,1), or crosses SP(0,1) from the frequency range of Cluster(1) into the frequency range of Cluster(0). Furthermore, all interrupt requests are migrated to a processor core in Cluster(0), and Cluster(1) is deactivated.

In short, the transitions between (S2) and (S4) in either direction occurs under the conditions: when the second cluster was initially deactivated before the transition, and when the required number of active processor cores (i.e., hTLP) is lower than or equal to a total number of active processor cores in the first cluster. A transition between (S2) and (S4) in either direction means that the interrupt requests are migrated from the first cluster to the second cluster. Furthermore, a transition between (S2) and (S4) in either direction means that the second cluster is activated and the first cluster is deactivated after the transition.

In (S1) and (S3), both Cluster(0) and Cluster(1) are initially active. In (S1), Cluster(0) owns the interrupt-handling processor (shown as the lined block) that handles all interrupt requests. When the current operating frequency enters SP(0,1) or crosses SP(0,1) from the frequency range of Cluster(0) into the frequency range of Cluster(1), the management module 120 determines whether to migrate interrupt requests to Cluster(1), and whether to deactivate Cluster(0). These determinations are dictated by which operating scenario that the system is currently in and which operating scenario that the system is to enter. The system may transition from (S1) to (S3), in which all interrupt requests are migrated to a processor core (shown as the lined block in scenario (S3)) in Cluster(1). Similarly, the system may transition from (S3) to (S1) when the current operating frequency enters SP(0,1) or crosses SP(0,1) from the frequency range of Cluster(1) into the frequency range of Cluster(0). In the transition from (S3) to (S1), all interrupt requests are migrated to a processor core in Cluster(0).

In short, the transitions between (S1) and (S3) in either direction occurs under the conditions: when the second cluster was initially activated before the transition, and when the required number of active processor cores (i.e., hTLP) is greater than a total number of active processor cores in the first cluster. A transition between (S1) and (S3) in either direction means that the interrupt requests are migrated from the first cluster to the second cluster. Furthermore, a transition between (S1) and (S3) in either direction means that both the first and second clusters maintain their active states.

The system may also transition between the left side and right side of FIG. 3. For example, the transition from (S2) to (S1), as well as the transition from (S4) to (S3) occur under the conditions: when the second cluster was initially deactivated before the transition, and when the required number of active processor cores (i.e., hTLP) increases to be greater than a total number of active processor cores in the first cluster. After either of these transitions, the second cluster is activated and the interrupt requests are not migrated; i.e., handled by the same cluster as before the transition.

Furthermore, the transition from (S1) to (S2), as well as the transition from (S3) to (S4) occur under the conditions: when the second cluster was initially activated before the transition, and when the required number of active processor cores (i.e., hTLP) decreases to be lower than or equal to a total number of active processor cores in the first cluster. After either of two transitions, the second cluster is deactivated and the interrupt requests are handled by the same cluster as before the transition.

Although FIG. 3 and the subsequent figures show that only one processor core at a time handles interrupt requests, in some cases more than one processor cores may handle interrupt requests at the same time. Thus, in some embodiments, when activating the second cluster, the system identifies one or more target processor cores among the second processor cores in the second cluster and migrates the interrupt requests from the first cluster to the one or more target processor cores in the second cluster.

Figure 4:
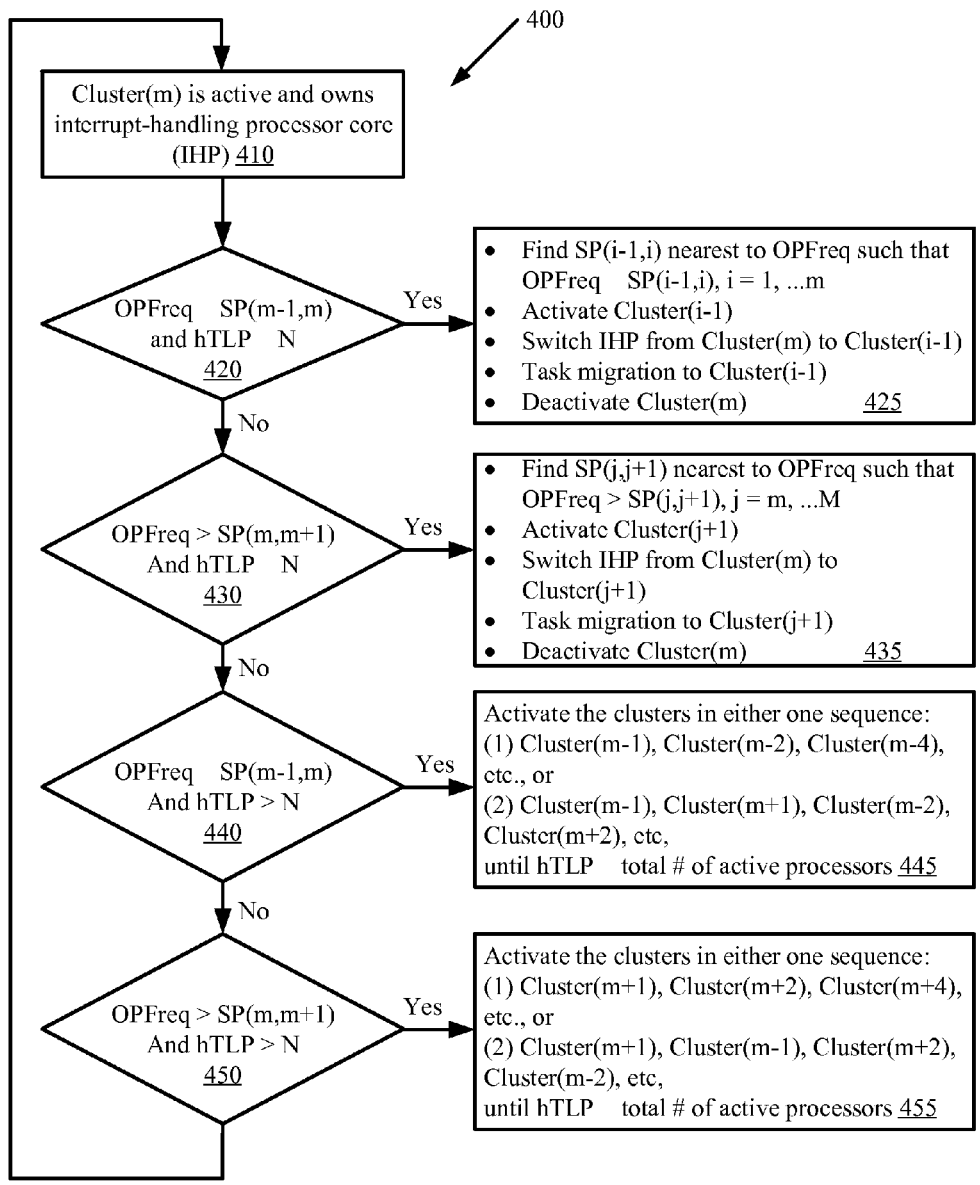
FIG. 4 is a flow diagram illustrating a method for efficiently operating a multi-cluster system according to one embodiment.

FIG. 4 is a flow diagram illustrating a method 400 for efficiently operating the multi-cluster system 100 according to one embodiment. The method 400 is performed by the multi-cluster system 100; for example, the management module 120 of FIG. 1. It is assumed without loss generality that the clusters, when ordered according to their respective peak performance frequency ranges from low to high in frequency, follow the order of Cluster(0)<Cluster(1)<Cluster(2)< . . . <Cluster(M). It is also assumed that, in this example, the system workload that can be efficiently handled by a single cluster (Cluster(m)) is when hTLP≤N (or equivalently, when the required number of active processor cores is less than or equal to N), where N is the number of processors in Cluster(m) and m is an integer index, 0≤m≤M.

Initially, at block 410 Custer(m) is active and owns the interrupt-handling processor core (herein referred to as the IHP). Cluster (m) is associated with SP(m−1,m) and SP(m, m+1), which are the lower and upper boundaries of the predetermined frequency range of Cluster(m). For simplicity, the operating frequency is herein referred to as OPFreq. Moreover, the term "OPFreq≤SP(i,j)" or its equivalent means that the operating frequency is within frequency spot SP(i,j) or is lower than SP(i,j). In other words, the operating frequency has decreased and entered or crossed frequency spot SP(i,j). Similarly, "OPFreq>SP(i,j)" or its equivalent means that the operating frequency has increased and crossed frequency spot SP(i,j).

If the system 100 detects that OPFreq≤SP(m−1,m) and hTLP≤N, then the condition specified in block 420 is satisfied and the system proceeds to block 425 to find an SP(i−1,i) nearest to OPFreq such that OPFreq≤SP(i−1,i) where 1≤i≤m. The system 100 also activates Cluster(i−1), switches the IHP from Cluster(m) to Cluster(i−1), performs task migration to Cluster(i−1), and deactivate Cluster(m). If the condition specified in block 420 is not satisfied, the system proceeds to block 430.

At block 430, if the system 100 detects that OPFreq>SP(m,m+1) and hTLP≤N, then the condition specified in block 430 is satisfied and the system proceeds to block 435 to find SP(j,j+1) nearest to OPFreq such that OPFreq>SP(j,j+1), where m≤j≤M. The system 100 also activates Cluster(j+1), switches the IHP from Cluster(m) to Cluster(j+1), performs task migration to Cluster(j+1), and deactivate Cluster(m). If the condition specified in block 430 is not satisfied, the system proceeds to block 440.

Using the example of FIG. 3, the transition from block 410 to block 420 corresponds to the transition from (S4) to (S2), and the transition from block 410 to block 430 corresponds to the transition from (S2) to (S4).

At block 440, if the system 100 detects that OPFreq≤SP (m−1,m) and hTLP>N, then the condition specified in block 440 is satisfied and the system proceeds to block 445 to activate the clusters in either one of the sequences: (1) Cluster(m−1), Cluster(m−2), Cluster(m−3), etc., or (2) Cluster(m−1), Cluster(m+1), Cluster(m−2), Cluster(m+2), etc., until the active processor cores in the system 100 provide sufficient processing capabilities to support the system workload; in other words, until the total number of active processor cores is greater than or equal to the required number of active processor cores. In this case, Cluster(m) stays active. The IHP may stay in the same cluster (e.g., in Cluster(m)) as before the transition to block 445; an example of the transition is from (S4) to (S3) in FIG. 3. Alternatively, a processor core in another activated cluster may take on the role of IHP in the transition to block 445; an example of the transition is from (S4) to (S1) directly, or from (S4) to (S1) via (S3).

If the condition specified in block 440 is not satisfied, the system 100 proceeds to block 450. At block 450, if the system 100 detects that OPFreq>SP(m,m+1) and hTLP>N, then the condition specified in block 450 is satisfied and the system proceeds to block 455 to activate the clusters in either one of the sequences: (1) Cluster(m+1), Cluster(m+2), Cluster(m+3), etc., or (2) Cluster(m+1), Cluster(m−1), Cluster(m+2), Cluster(m−2), etc., until the active processor cores in the system 100 provide sufficient processing capabilities to support the system workload; in other words, until the total number of active processor cores is greater than or equal to the required number of active processor cores. In this case, Cluster(m) stays active. The IHP may stay in the same cluster (e.g., in Cluster(m)) as before the transition to block 455; an example of the transition is from (S2) to (S1) in FIG. 3. Alternatively, a processor core in another activated cluster may take on the role of IHP in the transition to block 455; an example of the transition is from (S2) to (S3) directly, or from (S2) to (S3) via (S4).

If the condition specified in block 450 is not satisfied, the system 100 may loop back to block 410. The method 400 may be repeated at a fixed interval, when a new operating event is detected, or when a change in the operating frequency or system workload is detected.

As shown in blocks 445 and 455, the system may activate more than one cluster when condition 440 or 450 is satisfied. In each of the activated cluster, the system may determine to activate all, or less than all, of the processor cores in that cluster. In one embodiment, the system may determine whether to activate or deactivate one or more processor cores in one or more clusters other than the active cluster and the target cluster. The determination may be made according to the required number of active processor cores.

Figure 5:
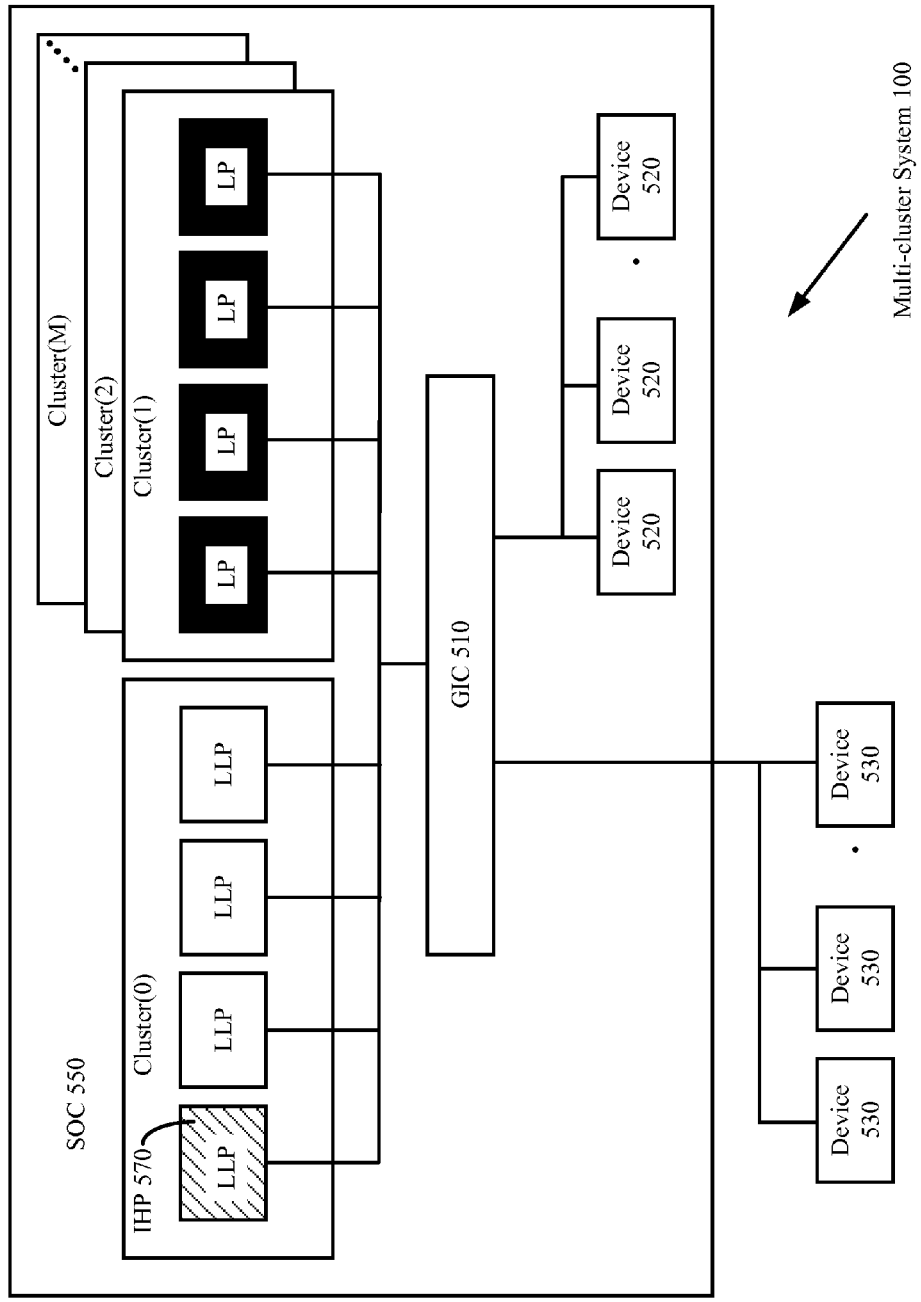
FIG. 5 illustrates the multi-cluster system of FIG. 1 with additional details of the interrupt-handling functionality according to one embodiment.

FIG. 5 illustrates the multi-cluster system 100 of FIG. 1 with additional details of the interrupt-handling functionality, according to one embodiment. In this embodiment, the multi-cluster system 100 includes a global interrupt controller (GIC) 510 coupled to each processor in the system 100 and a plurality of devices 520 and 530. The devices 520 are on-chip; i.e., on the same SOC 550 as the (M+1) clusters, and the devices 530 are off-chip. Examples of the devices 520 include, but are not limited to, graphic processors, signal processors, etc. Examples of the devices 530 include, but are not limited to, system memory, I/O devices, etc. The devices 520 and 530, as well as the processors in the clusters, may generate interrupt requests and send the requests to the GIC 510. The GIC 510 is configured to forward the requests to the interrupt-handling processor core (IHP 570). In one embodiment, in response to a determination to migrate the interrupt requests (e.g., from (S2) to (S4) or from (S1) to (S3) in FIG. 3), the interrupt-handling role of the IHP 570 will migrate to one or more processor cores in another activated cluster.

Figure 6:
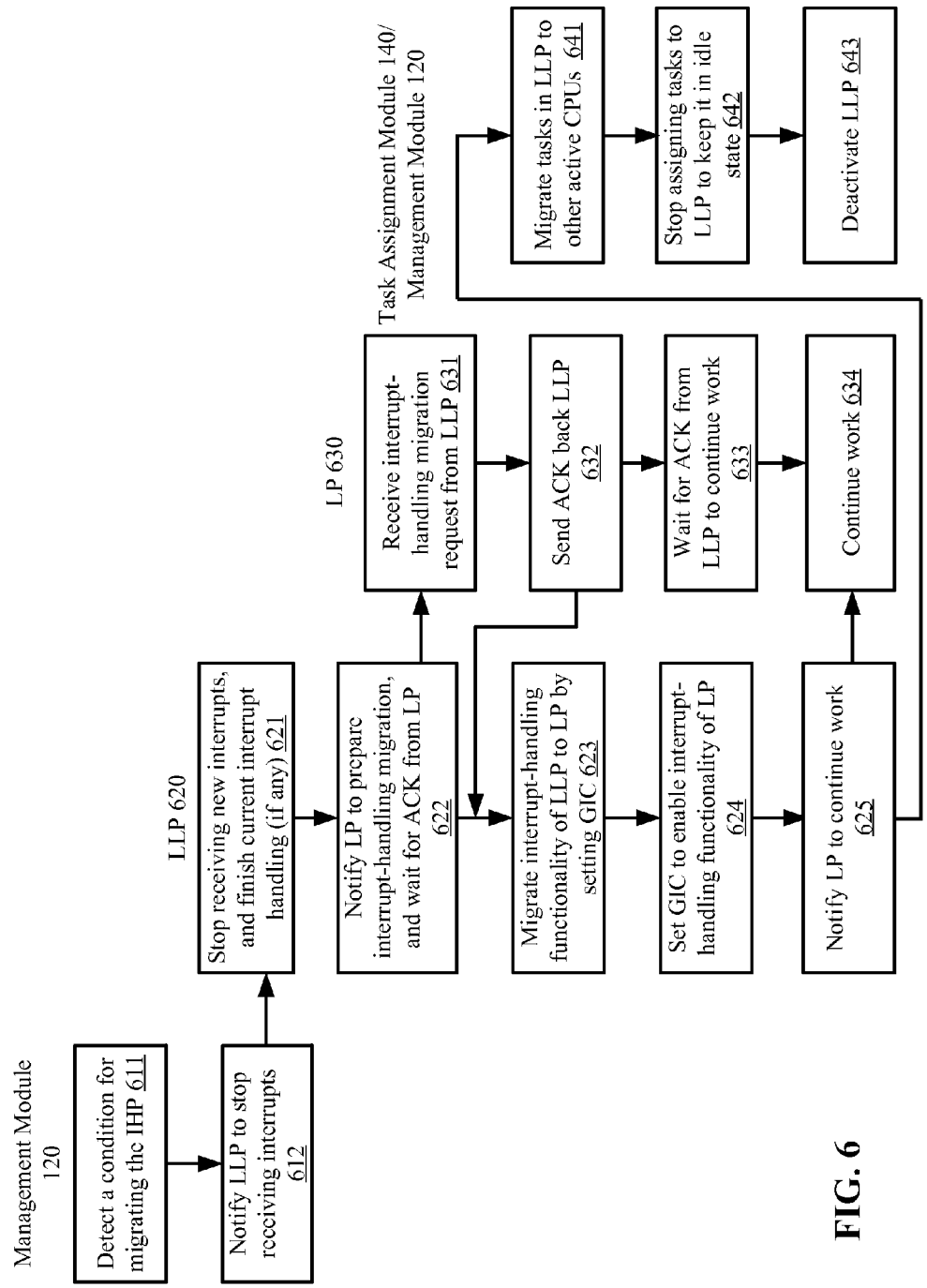
FIG. 6 illustrate a process for migrating interrupt requests and tasks from one cluster to another cluster according to one embodiment.

FIG. 6 is a diagram illustrating a process for migrating interrupt requests and tasks from a processor core (represented by LLP 620) in a first cluster (Cluster(0)) to a processor core (represented by LP 630) in a second cluster (Cluster(1)) according to one embodiment. As an example, initially, Cluster(0) is active and Cluster(1) is inactive. At block 611, the management module 120 detects a condition for migrating interrupt requests from an LLP 620 in Cluster (0) to the LP 630 in Cluster(1) and then deactivating the LLP 620; e.g., the condition for transitions between (S2) and (S4) in FIG. 3. When the event is detected, the management module 120 notifies the LLP 620 to stop receiving interrupts at block 612. Upon receiving the notification from the management module 120 at block 621, the LLP 620 stops receiving new interrupts and finishes current interrupt handling, if there is any. At block 622, the LLP 620 notifies the LP 630 to prepare for the migration of interrupt requests, and wait for an acknowledgement (ACK) from the LP 630. When the LP 630 receives the notification from the LLP 620 at block 631, it sends an ACK back to the LLP 620 at block 632. Then at block 633 the LP 630 waits for an ACK from the LLP 620 to continue work.

After the LLP 620 receives the ACK from the LP 630, at block 623, the LLP 620 migrates the interrupt-handling functionality to the LP 630 by setting the GIC 410 to forward all future interrupt requests to the LP 630. At block 624, the LLP 620 sets the GIC 410 to enable the interrupt-handling functionality of the LP 630. At block 625, the LLP 620 notifies the LP 630 to continue its work. The LP 630 continues its work after receiving the notification at block 634.

Subsequent to or concurrent with the interrupt-handling migration, at block 641 the task assignment module 140 starts to migrate tasks in the LLP 620 to other active CPUs. At block 642, the task assignment module 140 stops assigning tasks to the LLP 620 to keep it in an idle state. Then at block 643, the task assignment module 140 deactivates the LLP 620. In an alternative embodiment, some of the operations in blocks 641-643 may be performed by the management module 120.

Figure 7:
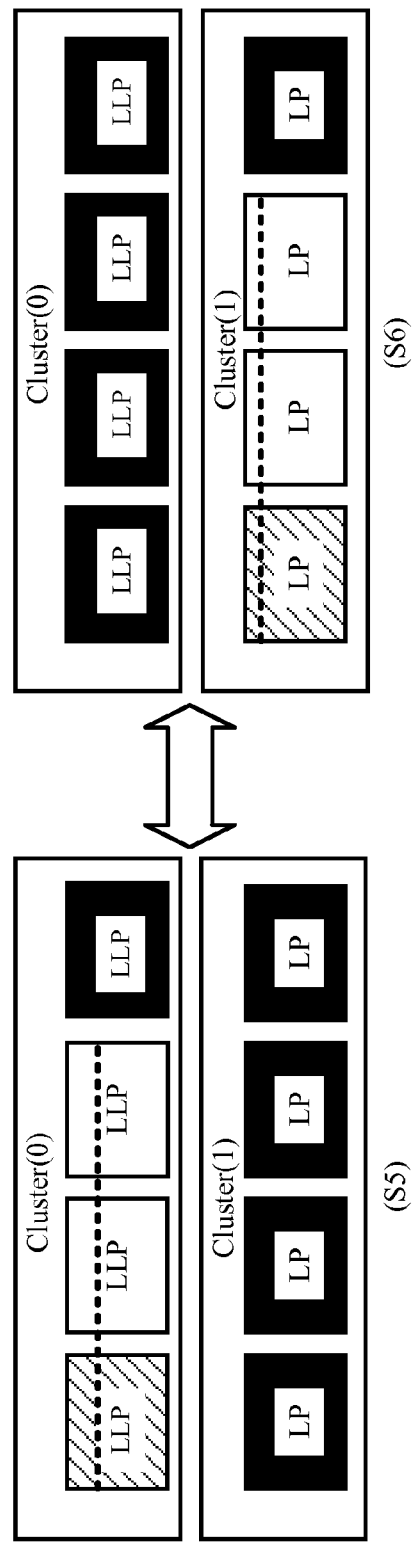
FIG. 7 illustrates transitions between two clusters according to one embodiment.

FIG. 7 is a diagram illustrating transitions between Cluster(0) and Cluster(1) according to one embodiment. As shown in low-performance scenario (S5), initially three out of four processor cores in Cluster(0) are active, with each processor core partially loaded (as indicated by the dotted line across the processor cores). The workload is balanced among the three active processor cores of Cluster(0). The transition from (S5) to the mid-performance scenario (S6) occurs under the same condition as the transition from (S2) to (S4) in FIG. 3. In the transition from (S5) to (S6), Cluster(0) is de-activated and Cluster(1) is activated. Furthermore, interrupt requests migrate from Cluster(0) to Cluster(1). After the transition, the workload is balanced among the three active processor cores of Cluster(1). Similarly, the transition from (S6) to (S5) occurs under the same condition as the transition from (S4) to (S2) in FIG. 3. In the transition from (S6) to (S5), Cluster(1) is de-activated and Cluster(0) is activated. Furthermore, interrupt requests migrate from Cluster(1) to Cluster(0).

This example shows that the transitions may occur even when the first cluster (i.e., the currently active cluster) has one or more inactive processor cores. This example also shows that the number of processors activated in the second cluster (i.e., the target cluster) depends on the current system workload. Thus, some of the processor cores in the second cluster may remain inactive if their processing capacity is not needed at the moment. Before and after the transitions, the workload is balanced among the active processor cores within each cluster.

Figure 8:
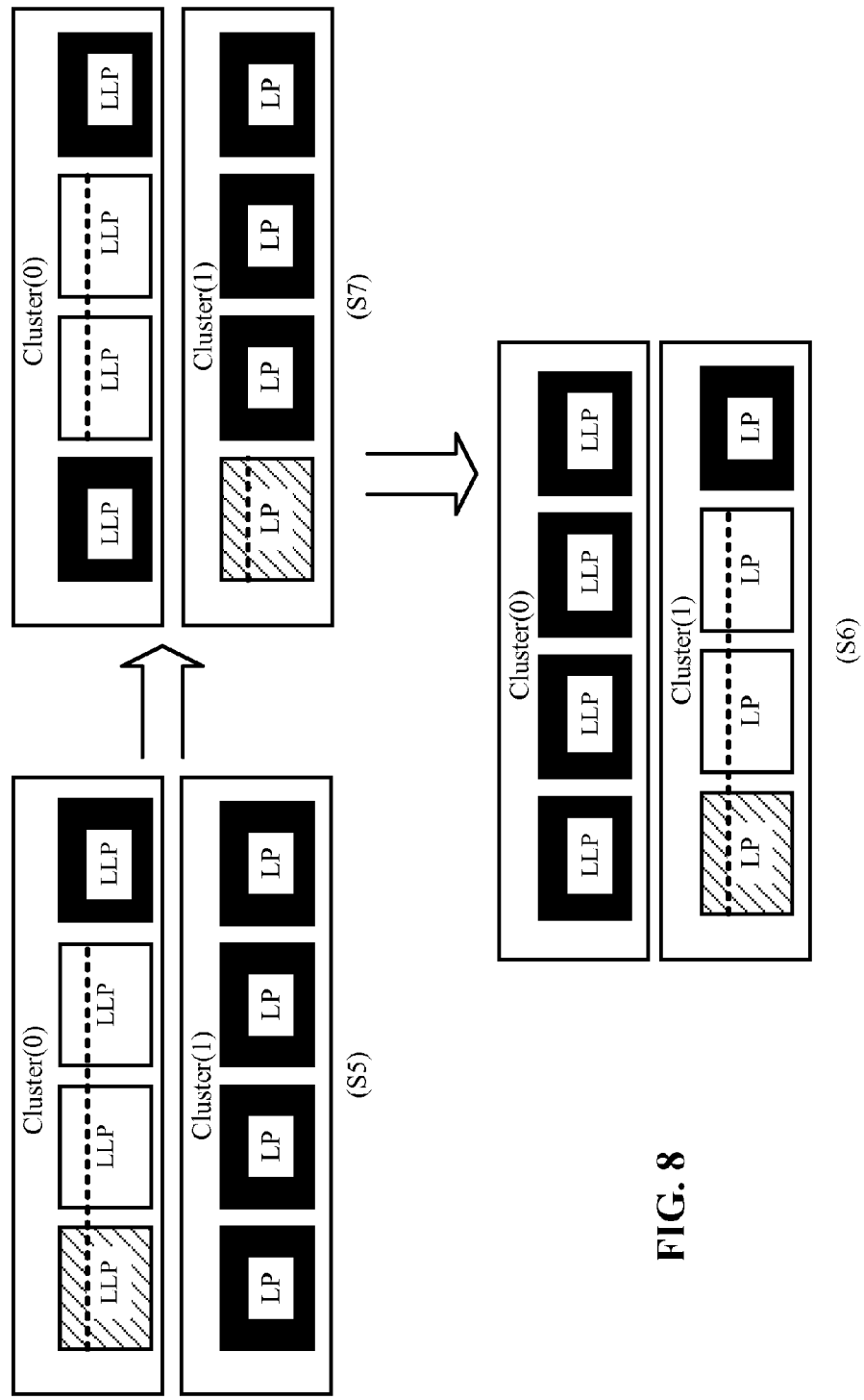
FIG. 8 illustrates transitions between two clusters according to another embodiment.

FIG. 8 is a diagram illustrating transitions between Cluster(0) and Cluster(1) according to another embodiment. In this example, scenarios (S5) and (S6) are the same as in FIG. 7. However, instead of directly transitioning from (S5) to (S6), an intermediate scenario (S7) exists where the interrupt-handling processor core migrates before the other processor cores of Cluster(0). This example illustrates the activation of a cluster and de-activation of another cluster may be performed by one processor core at a time, two processors at a time, or any number of processors at a time.

In scenario (S7), both clusters have one or more active processor cores. In one embodiment, the two clusters may operate at substantially the same frequency; e.g., in the frequency spot SP(0,1). Alternatively, the two clusters may operate in their respective frequency ranges, under the constraints that the operating frequency of Cluster(0) is in a frequency range not higher than SP(0,1) (i.e., on one side of SP(0,1)) and the operating frequency of Cluster(1) is in a frequency range not lower than SP(0,1) (i.e., on the other side of SP(0,1)), such that both cluster can operate with energy efficiency. In some embodiments, a single voltage regulator may supply two different operating frequencies to two different clusters if the difference in their operating frequencies is within a tolerance.

Figure 9:
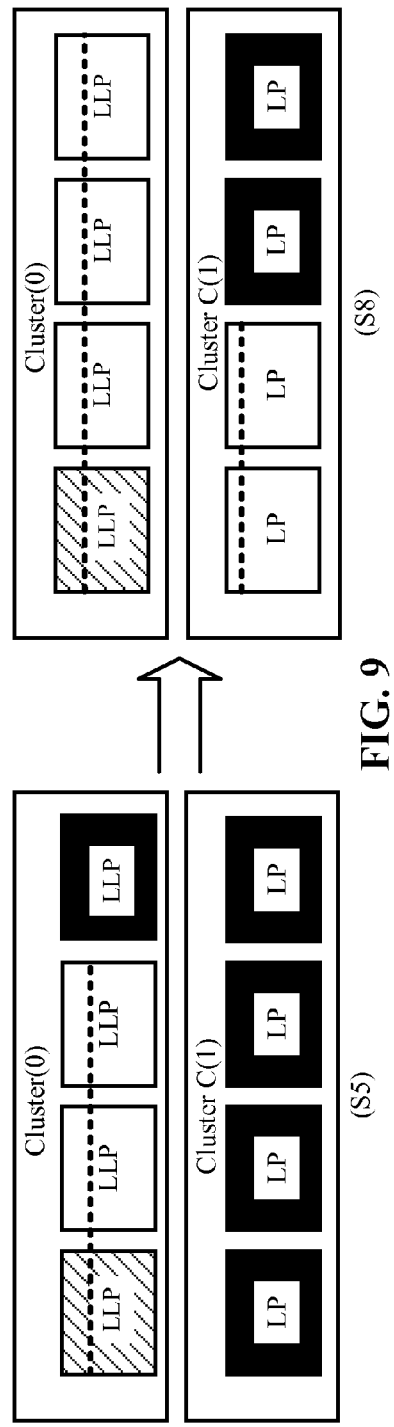
FIG. 9 illustrates a transition between two clusters according to yet another embodiment.

FIG. 9 is a diagram illustrating transitions between Cluster(0) and Cluster(1) according to yet another embodiment. This transition is similar to the transition from (S2) to (S1) in FIG. 3, except that an active cluster may contain one or more inactive processor cores. This example shows a transition from (S5) to (S8), which occurs when the current operating frequency is higher than SP(0,1), and hTLP is greater than the total number of processor cores in Cluster (0). In the transition, the inactive processor cores in Cluster (0) and one or more processor cores in Cluster(1) are activated. Not all of processor cores in Cluster(1) are activated, as long as those active processor cores provide sufficient processing capacity for handling the system workload. The interrupt-handling processor in this example stays in Cluster(0). The workload is balanced among the active processor cores within each cluster.

Figure 10:
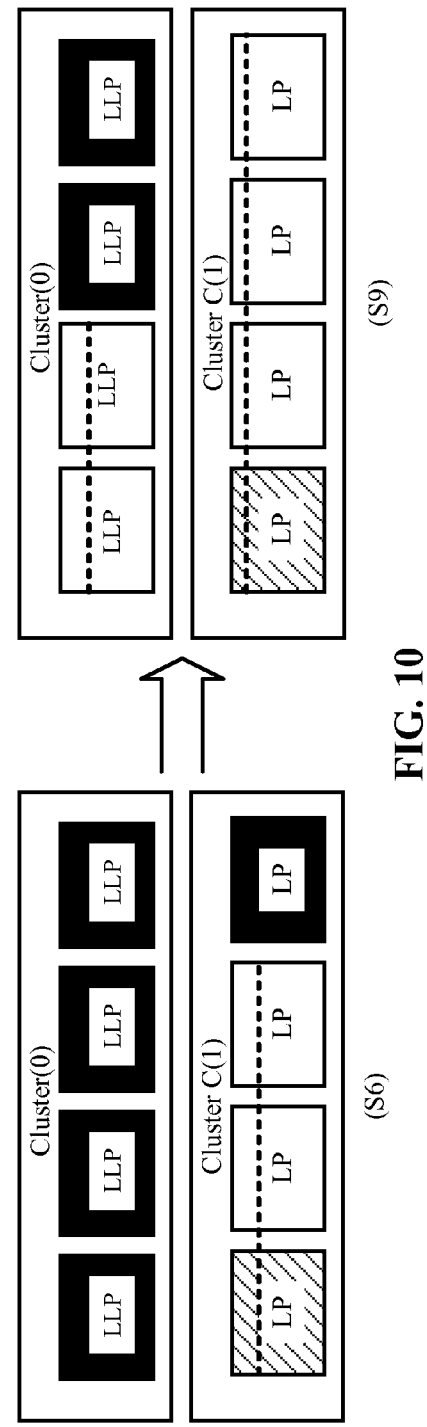
FIG. 10 illustrates a transition between two clusters according to yet another embodiment.

FIG. 10 is a diagram illustrating transitions between Cluster(0) and Cluster(1) according to yet another embodiment. This transition is similar to the transition from (S4) to (S3) in FIG. 3, except that an active cluster may contain one or more inactive processor cores. This example shows a transition from (S6) to scenario (S9), which occurs when the current operating frequency is lower than SP(0,1), and hTLP is greater than the total number of processor cores in Cluster(1). In the transition, the inactive processor core in Cluster(1) and one or more processor cores in Cluster(0) are activated. Not all of processor cores in Cluster(0) are activated, as long as those active processor cores provide sufficient processing capacity for handling the system workload. The interrupt-handling processor in this example stays in Cluster(1). The workload is balanced among the active processors within each cluster.

In some embodiments, all of the above transitions can be triggered by usage scenarios. For example, the system 100 may activate and de-activate different processor cores and clusters according to a number of pre-determined usage scenarios. For example, (S1) to (S2) transition, as shown in FIG. 3, may be triggered by turning on the screen, and (S2) to (S1) transition may be triggered by turning off the screen. The usage scenarios may trigger the transition of any of the transitions illustrated in FIG. 7-FIG. 10.

Furthermore, in any of the scenarios described above when at least two clusters (e.g., Cluster(0) and Cluster(1)) are active at the same time, the system 100 may assign heavy (e.g., when the number of threads or tasks exceeds a threshold) or urgent (e.g., when allowable delay is less than a threshold) tasks to one cluster that operates in a higher frequency range (e.g., Cluster(1)), and light or non-urgent (which is opposite to heavy or urgent) tasks to the other cluster that operates in a lower frequency range (e.g., Cluster(0)).

Figure 11:
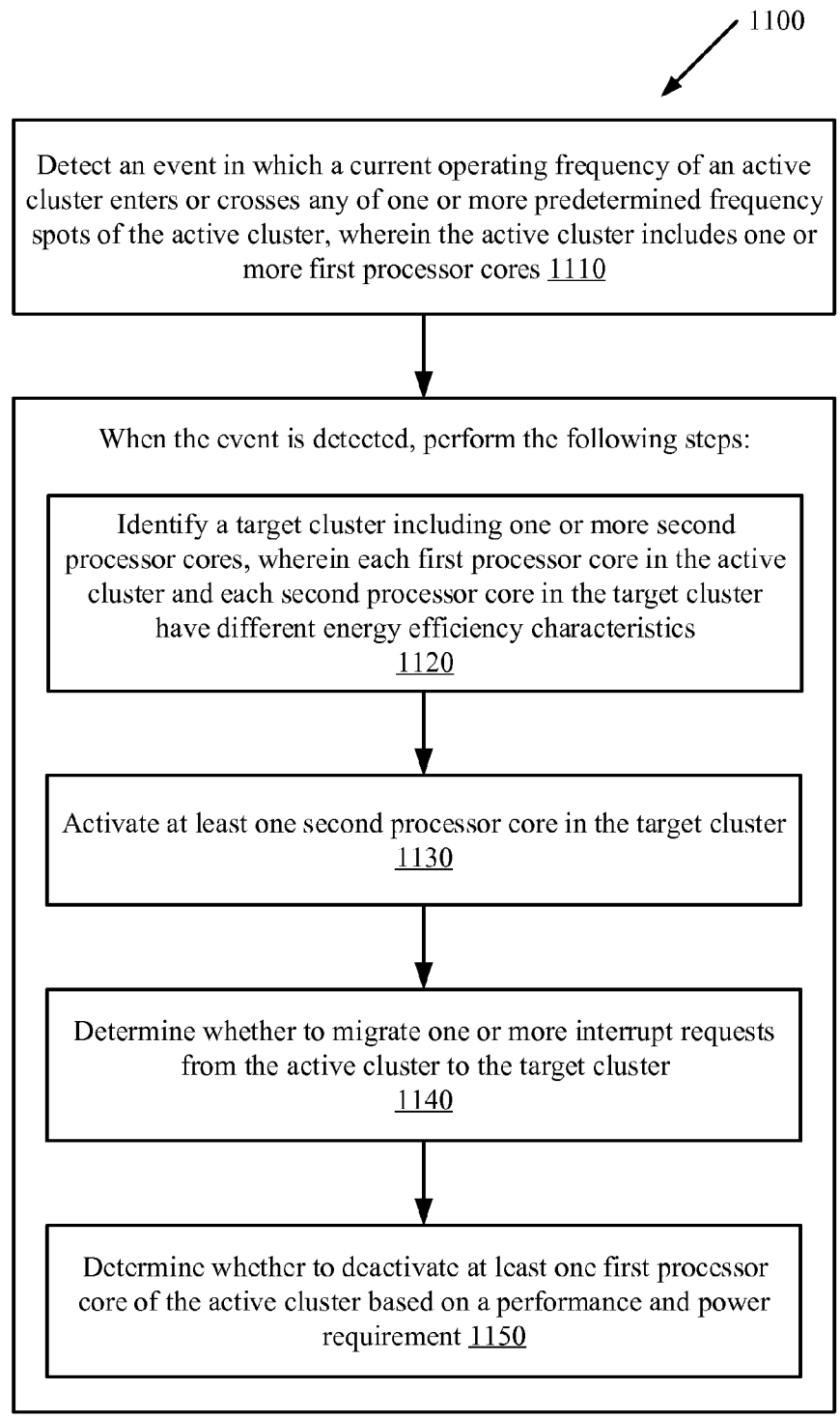
FIG. 11 is a flow diagram illustrating a method for managing energy efficiency in a computing system according to one embodiment.

FIG. 11 is a flow diagram illustrating a method 1100 for managing energy efficiency in a computer system according to one embodiment. The method 1100 may be performed by hardware (e.g., circuitry, dedicated logic, programmable logic, microcode, etc.), software (e.g., instructions run on a processing device), or a combination thereof. In one embodiment, the method 1100 is performed by the multi-cluster system 100 of FIG. 1, or more specifically, by the management module 120 of the system 100.

In one embodiment, the method 1100 begins when a system detects an event in which a current operating frequency of an active cluster enters or crosses any of one or more predetermined frequency spots of the active cluster, wherein the active cluster includes one or more first processor cores (block 1110). When the event is detected, the system 100 performs the following steps: identifying a target cluster including one or more second processor cores, wherein each first processor core in the active cluster and each second processor core in the target cluster have different energy efficiency characteristics (block 1120); activating at least one second processor core in the target cluster (block 1130); determining whether to migrate one or more interrupt requests from the active cluster to the target cluster (block 1140); and determining whether to deactivate at least one first processor core of the active cluster based on a performance and power requirement (block 1150).

The operations of the flow diagrams of FIGS. 4 and 11 have been described with reference to the exemplary embodiment of FIG. 1. However, it should be understood that the operations of the flow diagrams of FIGS. 4 and 11 can be performed by embodiments of the invention other than those discussed with reference to FIG. 1, and the embodiments discussed with reference to FIG. 1 can perform operations different than those discussed with reference to the flow diagrams. While the flow diagrams of FIGS. 4 and 11 show a particular order of operations performed by certain embodiments of the invention, it should be understood that such order is exemplary (e.g., alternative embodiments may perform the operations in a different order, combine certain operations, overlap certain operations, etc.). For example, in an embodiment, the determination steps in block 1140 and 1150 can be performed in parallel.

Various functional components or blocks have been described herein. As will be appreciated by persons skilled in the art, the functional blocks will preferably be implemented through circuits (either dedicated circuits, or general purpose circuits, which operate under the control of one or more processors and coded instructions), which will typically comprise transistors that are configured in such a way as to control the operation of the circuitry in accordance with the functions and operations described herein. The specific structure or interconnections of the transistors may be determined by a compiler, such as a register transfer language (RTL) compiler. RTL compilers operate upon scripts that closely resemble assembly language code, to compile the script into a form that is used for the layout or fabrication of the ultimate circuitry. RTL is well known for its role and use in the facilitation of the design process of electronic and digital systems.

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A method for managing energy efficiency in a computing system comprising a plurality of clusters, the method comprising:
   detecting an event in which a current operating frequency of an active cluster of the clusters enters or crosses any of one or more predetermined frequency spots of the active cluster, wherein the active cluster includes one or more first processor cores; and
   when the event is detected, performing following steps:
      identifying a target cluster of the clusters including one or more second processor cores, wherein each first processor core in the active cluster has different energy efficiency characteristics from each second processor core in the target cluster;
      activating at least one second processor core in the target cluster;
      determining whether to migrate one or more interrupt requests from the active cluster to the target cluster;
      determining whether to deactivate at least one first processor core of the active cluster when a required number of active processor cores is lower than or equal to the total number of the one or more first processor cores in the active cluster based on a performance and power requirement; and
      determining whether to maintain the at least one first processor core of the active cluster activated when the required number of active processor cores is greater than the total number of the one or more first processor cores in the active cluster, based on the performance and power requirement.

2. The method of claim 1, wherein the clusters are associated with respective one or more predetermined frequency spots, and wherein the respective one or more predetermined frequency spots are determined based on respective energy efficiency characteristics of processor cores of the clusters.

3. The method of claim 1, wherein each of the one or more predetermined frequency spots of the active cluster is associated with the active cluster and a respective other cluster in the clusters.

4. The method of claim 3, wherein on one side of each of the predetermined frequency spot, energy efficiency of each first processor core of the active cluster is higher than any given processor core of the respective other cluster, and on the other side of the predetermined frequency spot, the energy efficiency of each first processor core of the active cluster is lower than the any given processor core of the respective other cluster.

5. The method of claim 1, wherein the target cluster is identified to be one of the clusters that is associated with the entered or crossed predetermined frequency spot.

6. The method of claim 1, wherein determining whether to migrate the one or more interrupt requests from the active cluster to the target cluster further comprises:
directly migrating the one or more interrupt requests from the active cluster to the target cluster without migrating the one or more interrupt requests to any other clusters.

7. The method of claim 1, wherein determining whether to migrate the one or more interrupt requests from the active cluster to the target cluster further comprises:
migrating the one or more interrupt requests from the active cluster to one or more other clusters, wherein the one or more other clusters have one or more peak performance frequency ranges that, compared to a peak performance range of the target cluster, are closer in frequency to a peak performance frequency range of the active cluster; and
migrating interrupt requests subsequent to the one or more interrupt requests from the one or more other clusters to the target cluster.

8. The method of claim 1, wherein activating the at least one of the one or more second processor cores in the target cluster further comprises:
maintaining the target cluster activated if the target cluster is activated before the identification; and
switching the target cluster to be activated if the target cluster is deactivated before the identification.

9. The method of claim 1, further comprising:
identifying one or more target processor cores among the one or more second processor cores in the target cluster; and
migrating the one or more interrupt requests from the active cluster to the one or more target processor cores in the target cluster.

10. The method of claim 1, further comprising:
obtaining the required number of active processor cores,
wherein at least one of the determining whether to migrate the one or more interrupt requests from the active cluster to the target cluster and the determining whether to deactivate at least one first processor core of the active cluster based on the performance and power requirement is performed according to a total number of active processor cores in the clusters and the required number of active processor cores.

11. The method of claim 10, wherein the required number of active processor cores corresponds to a number of threads or tasks with loading greater than a threshold.

12. The method of claim 10, wherein when the target cluster is deactivated before the identification and when the required number of active processor cores is lower than or equal to a total number of the one or more first processor cores in the active cluster, the method further comprising:
migrating the one or more interrupt requests from the active cluster to the target cluster.

13. The method of claim 12, further comprising: deactivating the active cluster.

14. The method of claim 10, wherein when the target cluster is activated before the identification and when the required number of active processor cores is greater than the total number of the one or more first processor cores in the active cluster, the method further comprising: migrating the one or more interrupt requests from the active cluster to the target cluster.

15. The method of claim 14, further comprising: maintaining the active cluster activated.

16. The method of claim 10, wherein when the target cluster is deactivated before the identification and when the required number of active processor cores is greater than the total number of the one or more first processor cores in the active cluster, the method further comprising: determining not to migrate the one or more interrupt requests from the active cluster to the target cluster; and maintaining the active cluster activated.

17. The method of claim 10, wherein when the target cluster is activated before the identification and when the required number of active processor cores is lower than or equal to the total number of the one or more first processor cores in the active cluster, the method further comprising: determining to migrate the one or more interrupt requests from the active cluster to the target cluster; and deactivating the active cluster.

18. The method of claim 1, wherein,
in response to a determination not to deactivate the active cluster, the method further comprises:
operating the active cluster in a first frequency range on one side of a frequency spot of the active cluster; and
operating the target cluster in a second frequency range on the other side of the frequency spot of the active cluster.

19. The method of claim 1, further comprising:
in response to a determination not to deactivate the active cluster,
balancing workload among processor cores in at least the active cluster and the target cluster.

20. The method of claim 19, wherein balancing the workload among the processor cores in at least the active cluster and the target cluster further comprises:
assigning heavy or urgent tasks to one of the active cluster and the target cluster that operates in a higher frequency range; and
assigning light or non-urgent tasks to the other one of the active cluster and the target cluster that operates in a lower frequency range.

21. The method of claim 1, further comprising:
obtaining a current operating scenario for the computing system,
wherein at least one of the determining whether to migrate the one or more interrupt requests from the active cluster to the target cluster and the determining whether to deactivate at least one first processor core of the active cluster based on the performance and power requirement is performed further according to the current operating scenario.

22. The method of claim 1, further comprising:
determining whether to activate or deactivate one or more processor cores in one or more clusters other than the active cluster and the target cluster.

23. The method of claim 22, wherein the determining whether to activate or deactivate one or more processor cores in one or more clusters other than the active cluster and the target cluster is determined according to the required number of active processor cores.

24. A system for managing energy efficiency comprising:
a plurality of clusters including a plurality of processor cores; and
an interconnect coupled to the plurality of clusters,
wherein one or more of the processor cores are operative to perform operations of a management module, the management module configured to:
detect an event in which a current operating frequency of an active cluster of the clusters enters or crosses any of one or more predetermined frequency spots of the active cluster, wherein the active cluster includes one or more first processor cores; and
the management module is further configure to, when the event is detected:
identify a target cluster of the clusters including one or more second processor cores, wherein each first processor core in the active cluster has different energy efficiency characteristics from each second processor core in the target cluster;
activate at least one second processor core in the target cluster;
determine whether to migrate one or more interrupt requests from the active cluster to the target cluster
determine whether to deactivate at least one first processor core of the active cluster when the required number of active processor cores is lower than or equal to the totalnumber of the one or more first processor cores in the active cluster, based on a performance and power requirement; and
determine whether to maintain at least one first processor core of the active cluster activated when the required number of active processor cores is greater than the total number of the one or more first processor cores in the active cluster, based on the performance and power requirement.

25. The system of claim 24, wherein the clusters are associated with respective one or more predetermined frequency spots, and wherein the respective one or more predetermined frequency spots are determined based on respective energy efficiency characteristics of processor cores of the clusters.

26. The system of claim 24, wherein each of the one or more predetermined frequency spots of the active cluster is associated with the active cluster and a respective other cluster in the clusters.

27. The system of claim 26, wherein on one side of each of the predetermined frequency spot, energy efficiency of each first processor core of the active cluster is higher than any given processor core of the respective other cluster, and on the other side of the predetermined frequency spot, the energy efficiency of each first processor core of the active cluster is lower than the any given processor core of the respective other cluster.

28. The system of claim 24, wherein the target cluster is identified to be one of the clusters that is associated with the entered or crossed predetermined frequency spot.

29. The system of claim 24, wherein the management module is further configured to:
directly migrate the one or more interrupt requests from the active cluster to the target cluster without migrating the one or more interrupt requests to any other clusters.

30. The system of claim 24, wherein the management module is further configured to:
migrate the one or more interrupt requests from the active cluster to one or more other clusters, wherein the one or more other clusters have one or more peak performance frequency ranges that, compared to a peak performance range of the target cluster, are closer in frequency to a peak performance frequency range of the active cluster; and
migrate interrupt requests subsequent to the one or more interrupt requests from the one or more other processor cores to the target cluster.

31. The system of claim 24, wherein the management module is further configured to:
maintain the target cluster activated if the target cluster is activated before the identification; and
switch the target cluster to be activated if the target cluster is deactivated before the identification.

32. The system of claim 24, wherein the management module is further configured to:
identify one or more target processor cores among the one or more second processor cores in the target cluster; and
migrate the one or more interrupt requests from the active cluster to the one or more target processor cores in the target cluster.

33. The system of claim 24, wherein the management module is further configured to obtain the required number of active processor cores,
wherein at least one of the determining whether to migrate the one or more interrupt requests from the active cluster to the target cluster and the determining whether to deactivate at least one first processor core of the active cluster based on the performance and power requirement is performed according to a total number of active processor cores in the clusters and the required number of active processor cores.

34. The system of claim 33, wherein the required number of active processor cores corresponds to a number of threads or tasks with loading greater than a threshold.

35. The system of claim 33, wherein when the target cluster is deactivated before the identification and when the required number of active processor cores is lower than or equal to a total number of the one or more first processor cores in the active cluster, the management module is further configured to: migrate the one or more interrupt requests from the active cluster to the target cluster.

36. The system of claim 35, wherein the management module is further configured to deactivate the active cluster.

37. The system of claim 33, wherein when the target cluster is activated before the identification and when the required number of active processor cores is greater than the total number of the one or more first processor cores in the active cluster, the management module is further configured to: migrate the one or more interrupt requests from the active cluster to the target cluster.

38. The system of claim 37, wherein the management module is further configured to maintain the active cluster activated.

39. The system of claim 33, wherein when the target cluster is deactivated before the identification and when the required number of active processor cores is greater than the total number of the one or more first processor cores in the active cluster, the management module is further configured to: determine not to migrate the one or more interrupt requests from the active cluster to the target cluster; and maintain the active cluster activated.

40. The system of claim 33, wherein when the target cluster is activated before the identification and when the required number of active processor cores is lower than or equal to the total number of the one or more first processor cores in the active cluster, the management module is further configured to: determine to migrate the one or more interrupt requests from the active cluster to the target cluster; and deactivate the active cluster.

41. The system of claim 24, wherein, in response to a determination not to deactivate the active cluster, the management module is further configured to:
 operate the active cluster in a first predetermined frequency range on one side of a frequency spot of the active cluster; and
 operate the target cluster in a second predetermined frequency range on the other side of the frequency spot of the active cluster.

42. The system of claim 24, further comprises a task assignment module configured to: in response to a determination not to deactivate the active cluster, balance workload among processor cores in at least the active cluster and the target cluster.

43. The system of claim 42, wherein, when balancing the workload, the task assignment is further configured to:
 assign heavy or urgent tasks to one of the active cluster and the target cluster that operates in a higher frequency range; and
 assign light or non-urgent tasks to the other one of the active cluster and the target cluster that operates in a lower frequency range.

44. The system of claim 24, wherein the management module is further configured to:
 obtain a current operating scenario for the computing system,
 wherein at least one of the determining whether to migrate the one or more interrupt requests from the active cluster to the target cluster and the determining whether to deactivate at least one first processor core of the active cluster based on the performance and power requirement is performed further according to the current operating scenario.

45. The system of claim 24, wherein the management module is further configured to determine whether to activate or deactivate one or more processor cores in one or more clusters other than the active cluster and the target cluster.

46. The system of claim 45, wherein the management module is further configured to determine whether to activate or deactivate one or more processor cores in one or more clusters other than the active cluster and the target cluster according to a required number of active processor cores.

* * * * *